(12) United States Patent
Eickhoff et al.

(10) Patent No.: US 8,377,178 B2
(45) Date of Patent: Feb. 19, 2013

(54) FUEL SOURCE FOR ELECTROCHEMICAL CELL

(75) Inventors: Steven J. Eickhoff, Brooklyn Park, MN (US); Chunbo Zhang, Manhattan Beach, CA (US); Steve Swanson, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/368,854

(22) Filed: Feb. 8, 2012

(65) Prior Publication Data

US 2012/0137570 A1 Jun. 7, 2012

Related U.S. Application Data

(63) Continuation of application No. 12/634,264, filed on Dec. 9, 2009, now Pat. No. 8,172,928.

(60) Provisional application No. 61/144,911, filed on Jan. 15, 2009, provisional application No. 61/144,035, filed on Jan. 12, 2009.

(51) Int. Cl.
*B01D 53/22* (2006.01)

(52) U.S. Cl. ............. 96/4; 95/43; 95/52; 96/6; 429/188; 429/515

(58) Field of Classification Search ................ 95/43, 52; 96/4, 6; 429/188, 515
See application file for complete search history.

(56) References Cited

U.S. PATENT DOCUMENTS

| | | | |
|---|---|---|---|
| 6,127,058 A | 10/2000 | Pratt et al. | |
| 6,632,270 B2 * | 10/2003 | Edlund et al. | 96/4 |
| 6,824,592 B2 * | 11/2004 | Monzyk et al. | 96/4 |
| 7,001,681 B2 | 2/2006 | Wood | |
| 7,445,860 B2 | 11/2008 | Rezachek et al. | |
| 7,455,829 B2 | 11/2008 | Eickhoff et al. | |
| 7,455,924 B2 | 11/2008 | Wood | |
| 7,462,223 B2 * | 12/2008 | Kiefer et al. | 96/4 |
| 7,670,698 B2 | 3/2010 | Eickhoff et al. | |
| 7,807,131 B2 * | 10/2010 | Eickhoff | 423/658.2 |
| 8,057,939 B2 | 11/2011 | Eickhoff et al. | |
| 8,172,928 B2 | 5/2012 | Eickhoff et al. | |
| 2005/0181245 A1 | 8/2005 | Bonne et al. | |
| 2005/0197246 A1 | 9/2005 | Yoshida et al. | |
| 2006/0014059 A1 | 1/2006 | Wood | |
| 2007/0037040 A1 | 2/2007 | Koyama et al. | |
| 2007/0092767 A1 | 4/2007 | Eickhoff | |
| 2007/0092785 A1 | 4/2007 | Eickhoff | |
| 2007/0104996 A1 | 5/2007 | Eickhoff et al. | |
| 2007/0124989 A1 | 6/2007 | Eickhoff et al. | |
| 2007/0160887 A1 | 7/2007 | Eickhoff | |
| 2007/0178340 A1 | 8/2007 | Eickhoff | |
| 2007/0184312 A1 | 8/2007 | Eickhoff | |
| 2007/0237995 A1 | 10/2007 | Eickhoff et al. | |
| 2007/0264549 A1 | 11/2007 | Eickhoff et al. | |
| 2007/0287059 A1 | 12/2007 | Eickhoff et al. | |

(Continued)

OTHER PUBLICATIONS

Abdiwe, Ramadan, "Metal hydride overview" Mechanical Engineering Department University of Victoria www.engr.uvic.ca/~mech473/Metal%20hydride2.ppt Jul. 24, 2006.*

(Continued)

*Primary Examiner* — Jason M Greene
*Assistant Examiner* — Anthony Shumate
(74) *Attorney, Agent, or Firm* — Schwegman, Lundberg & Woessner, P.A.

(57) ABSTRACT

A fuel source for an electrochemical cell includes two or more chemical hydride pellets, a flexible, porous, liquid water impermeable, hydrogen and water vapor permeable membrane in contact with and at least partially surrounding each hydride pellet, and a porous metal hydride layer positioned between each hydride pellet. Air gaps are between each pellet.

16 Claims, 3 Drawing Sheets

U.S. PATENT DOCUMENTS

| | | |
|---|---|---|
| 2008/0032170 A1 | 2/2008 | Wainright et al. |
| 2008/0107930 A1 | 5/2008 | Eickhoff et al. |
| 2008/0131738 A1 | 6/2008 | Eickhoff |
| 2008/0268303 A1 | 10/2008 | Eickhoff |
| 2008/0305372 A1 | 12/2008 | Wood |
| 2009/0011292 A1 | 1/2009 | Rezachek et al. |
| 2009/0113795 A1 | 5/2009 | Eickhoff |
| 2009/0117423 A1 | 5/2009 | Eickhoff |
| 2009/0117442 A1 | 5/2009 | Eickhoff |
| 2009/0136853 A1* | 5/2009 | Mills .............................. 429/319 |
| 2009/0155663 A1 | 6/2009 | Serizawa et al. |
| 2009/0252670 A1 | 10/2009 | Eickhoff et al. |
| 2010/0043210 A1 | 2/2010 | Eickhoff |
| 2010/0178573 A1 | 7/2010 | Eickhoff et al. |
| 2011/0003237 A1 | 1/2011 | Eickhoff et al. |

OTHER PUBLICATIONS

"U.S. Appl. No. 12/634,264, Notice of Allowance Mailed Jan. 5, 2012", 11 pages.

* cited by examiner

FUEL SOURCE FOR ELECTROCHEMICAL CELL

RELATED APPLICATIONS

This application is a continuation of U.S. application Ser. No. 12/634,264, filed Dec. 9, 2009, now U.S. Pat. No. 8,172,928 that issued on May 8, 2012, and which claims the benefit of U.S. Provisional Patent Application 61/144,911, filed Jan. 15, 2009, entitled "FUEL SOURCE FOR ELECTROCHEMICAL CELL," and U.S. Provisional Patent Application 61/144,035, filed Jan. 12, 2009, entitled "FUEL SOURCE FOR ELECTROCHEMICAL CELL", the contents of which applications are incorporated herein by reference in their entirety.

BACKGROUND

1. Field of Invention

This invention relates to fuel sources for electrochemical cells such as hydrogen fuel cells.

2. Background

Hydrogen fuel cells have been proposed utilizing a reactive chemical hydride as a fuel source. Normally the chemical hydride is reacted with water to liberate hydrogen gas, which is then consumed by the fuel cell. Other protonic solvents besides water (e.g. alcohols, organic acids) may also be employed.

In such a fuel cell system, a housing is often employed to contain the fuel and reaction products in order to protect the fuel from reacting with atmospheric moisture when the fuel cell is not in service and to collect the generated hydrogen so it can be conducted to the fuel cell. It is desirable to include a maximum quantity of fuel in a housing of a given volume in order to achieve the highest possible hydrogen output and the longest possible running time for the fuel cell. However, the disadvantage of packing fuel too tightly into the housing is that the access of water to some parts of the fuel becomes restricted and the rate of hydrogen generation is then limited by the slow diffusion of water into the bulk of the fuel. As solid reaction products accumulate, they may further restrict water access, choking off the reaction. Ultimately, the reaction may reach a standstill and fuel utilization will be incomplete.

SUMMARY

Embodiments of the invention relate to a fuel source for an electrochemical cell. The fuel source comprises two or more chemical hydride pellets, a flexible, porous, liquid water impermeable, water-vapor and hydrogen permeable membrane in contact with and at least partially surrounding each chemical hydride pellet and a porous metal hydride layer positioned between each chemical hydride pellet. Air gaps are between each pellet.

Embodiments also relate to a fuel source for an electrochemical cell, including two or more chemical hydride pellets, positioned in two or more stacks, a flexible, porous, liquid water impermeable, water-vapor and hydrogen permeable membrane in contact with and at least partially surrounding each hydride pellet, a porous metal hydride layer, separating each hydride pellet stack and one or more spacers, positioned between each pellet. Air gaps are between each pellet.

Embodiments further relate to a fuel source for an electrochemical cell, including two or more chemical hydride pellets, positioned in a stack, a flexible, porous, liquid water impermeable, hydrogen and water vapor permeable membrane, in contact with and at least partially surrounding each chemical hydride pellet; a porous metal hydride pellet, positioned adjacent to one end of the stack and one or more spacers, positioned between each chemical hydride pellet and between the chemical hydride pellet and the porous metal hydride layer. Air gaps are between each pellet.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate principally to a fuel source for an electrochemical cell, such as a fuel cell. However, such a fuel source may also be employed for other purposes such as supplying fuel to a combustion engine, to a heating device, to a cooling device (e.g. a device operating with a Kelvinator type of refrigeration cycle), to a flame employed for lighting, to a flame employed as part of an analytical instrument, to a flame employed in a cutting or welding torch and for other devices which consume a fuel either via a flame or by catalytic oxidation to produce a useful effect. Embodiments of the present invention provide an improved fuel source, such as a pellet, which allows higher average rates of hydrogen generation (power) and increased extracted energy by providing a controlled porosity fuel structure, including channels, to maintain a low gas diffusion resistance throughout the discharging process.

Figure 1:
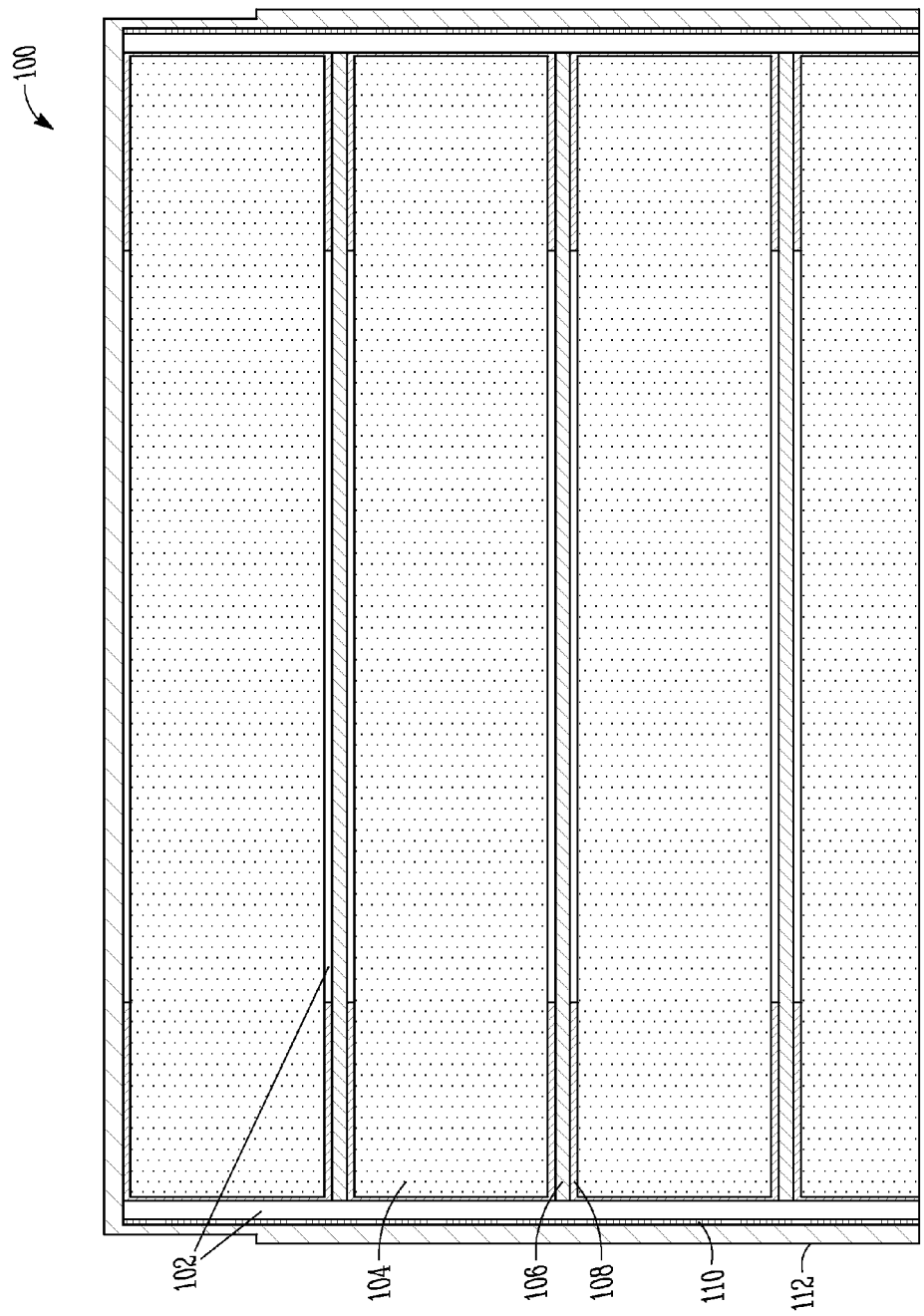
FIG. 1 illustrates a cross-sectional view of a fuel source, according to some embodiments.

Referring to FIG. 1, a cross-sectional view 100 of a fuel source is shown, according to some embodiments. Two or more compressed porous chemical hydride pellets 104 may be contacted with, or at least partially surrounded or wrapped with a flexible, porous water-vapor permeable layer 108 (such as TEFLON, GORE TEX, or NAFION) that prevents fuel particles from expanding into gas diffusion channels 106, adjacent the pellets 104 or other fuel source pellets. The gas diffusion channels may be constructed of porous metal hydride pellets for example. Air gaps 102 are between individual chemical hydride pellets 104, and between the chemical hydride pellets 104 and perforated enclosure 112. A liquid water impermeable, hydrogen and water-vapor permeable membrane or a particulate membrane 110 (such as TEFLON, GORE TEX, or NAFION) may also be positioned between chemical hydride pellets 104 and enclosure 112.

The chemical hydride is any water-reactive hydrogen-producing material that reacts with water vapor to produce hydrogen. Exemplary chemical hydrides comprise $LiAlH_4$, $NaAlH_4$, $KAlH_4$, $MgAlH_4$, $CaH_2$, $LiBH_4$, $NaBH_4$, $LiH$, and $MgH_2$, alkali metals, alkaline earth metals, and alkali metal salicides. Specific chemical hydrides comprise $LiAlH_4$, $NaAlH_4$, $NaBH_4$, $LiBH_4$, $LiH$, or any combination thereof. The chemical hydride pellets 104 may be manufactured with a controlled porosity. The perforated enclosure 112 may be the same container as the housing or the enclosure 112 may be a separate structure that is located inside the housing. The enclosure 112 may contain perforations to permit water ingress through the enclosure 112 walls into the outer surface of the pellet, from where water can then diffuse inward. The enclosure 112 may be shaped as a cylinder or other shapes may be utilized. Such shapes include, for example, a disc, cube, prism, or sphere.

The size of the particles that comprise the chemical hydride pellets should be in a range from 1-10 µm diameter to minimize resistance to the flow of water vapor through the chemical hydride, and thus adversely affect the rate of hydrogen generation. The distribution of the chemical hydride particle size can be chosen to optimize for rate of reaction or for hydrogen generation capacity. For example a monodisperse distribution of small chemical hydride particles would allow slow flow of water vapor through the chemical hydride, have a high hydrogen generation capacity but a low rate of hydrogen generation. A monodisperse large particle size distribution would allow faster flow of water vapor through the chemical hydride, have a high rate of hydrogen generation, but have a low hydrogen generation capacity. A bimodal distribution in which smaller particles of chemical hydride fit within the interstices of the larger chemical hydride particles could provide a balance between the rate of hydrogen generation and hydrogen generation capacity. Other particle size distributions are also possible.

Additionally, by varying which chemical hydride is used, the rate of reaction with water vapor can be adjusted, and therefore the rate of hydrogen generation. This can also be accomplished by using mixtures of two or more chemical hydrides. By varying which chemical hydride is used, and at the same time using a mixture of chemical hydrides, and particle size distribution, the rate of reaction of the chemical hydride with water vapor can further be controlled.

The chemical hydride is described herein as a pellet. As used herein this term is used in a broad sense to describe any shape or configuration of the chemical hydride particles that occupy in the space allotted to the chemical hydride in the fuel source. Thus, the shape of the chemical hydride pellet is not critical. It may be a, layer, disk, tablet, sphere, or have no specific shape. The shape of the chemical hydride particles may be determined by the shape of the fuel source and the need to make the most efficient use of the space allotted to the chemical hydride. If appropriate, differently shaped chemical hydride pellets can be used within one fuel source.

The metal hydride pellet 106 functions as a sort of hydrogen sponge that can quickly adsorb or desorb hydrogen at an almost constant pressure. A power generator with a fuel consisting of chemical hydride and metal hydride can accommodate pulses of power by using some of the hydrogen stored in the metal hydride, and can thus be designed for the average power of the range, resulting in lower cost, and reduced self-discharge. Additionally, sensitivity to ambient temperature and humidity may be reduced, because the power generator can draw on the hydrogen stored in the metal hydride. Metal hydrides comprise ab5 compounds, ab2 compounds, ab compounds, complex alloys, intermetallic compounds, solid solution alloys, or any combination thereof. Exemplary metal hydrides comprise $LaNi_5$, $LaNi_4.6Mn_{0.4}$, $MnNi_{3.5}Co_{0.7}Al_{0.8}$, $MnNi_4.2Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, or any combination thereof.

The metal hydride is described herein as a pellet. As noted above, the term metal hydride pellet used herein this term is used in a broad sense to describe any shape or configuration of the metal hydride that occupies the space allotted to the metal hydride in the fuel source. Thus, the shape in which the porous metal hydride exists is not critical. It may be present as a porous film, web, layer, disk, tablet, sphere, or have no specific shape. The shape of the porous metal hydride pellet may be determined by the shape of the fuel source and the need to make the most efficient use of the space allotted to the metal hydride. If appropriate, differently shaped metal hydride pellets can be used within one fuel source.

Figure 2:
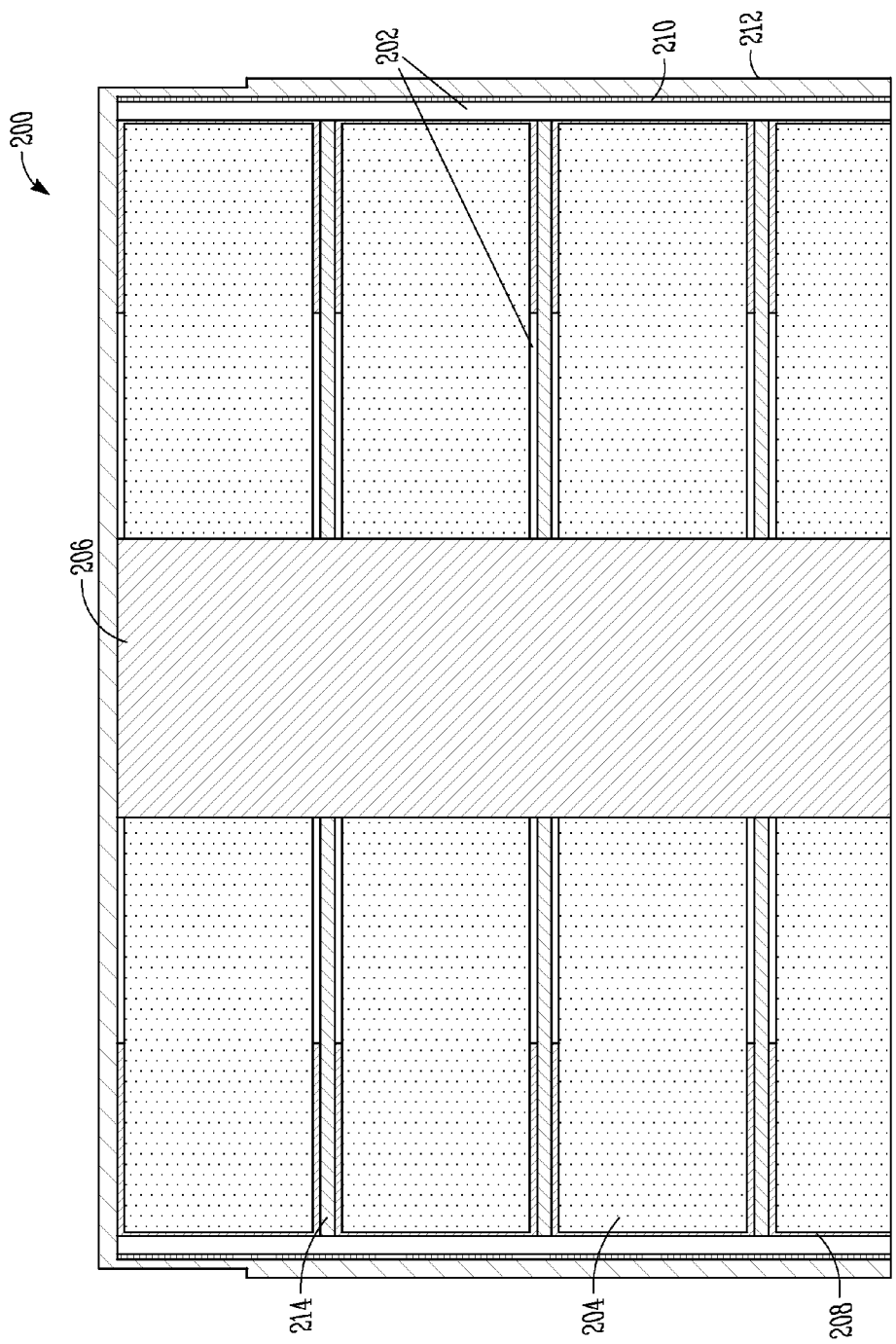
FIG. 2 illustrates a cross-sectional view of an alternative fuel source configuration, according to some embodiments.

Referring to FIG. 2, a cross-sectional view 200 of a fuel source is shown, according to some embodiments. In FIG. 2, the stack of two or more chemical hydride pellets 204 may be separated by a metal hydride pellet 206. The metal hydride may act as both a gas diffusion channel, and as a reversible hydrogen storage element for rapid delivery of hydrogen. The metal hydride 206 may be positioned such that two stacks of chemical hydride pellets 204 are formed. Two or more chemical hydride pellets 204 may be contacted with, or at least partially surrounded or wrapped with a flexible, porous water-vapor permeable layer 208 (such as TEFLON, GORE TEX, or NAFION). Each chemical hydride pellet 204 may be separated by a spacer 214. Air gaps 202 are between individual chemical hydride pellets 204, and between the chemical hydride pellets 204 and perforated enclosure 212. A liquid water impermeable, hydrogen and water-vapor permeable membrane or a particulate membrane 210 (such as TEFLON, GORE TEX, or NAFION) may also be positioned between the pellets 204 and enclosure 212. A particulate filter 214 may be positioned between the stacks of chemical hydride pellets 204 and enclosure 212.

Figure 3:
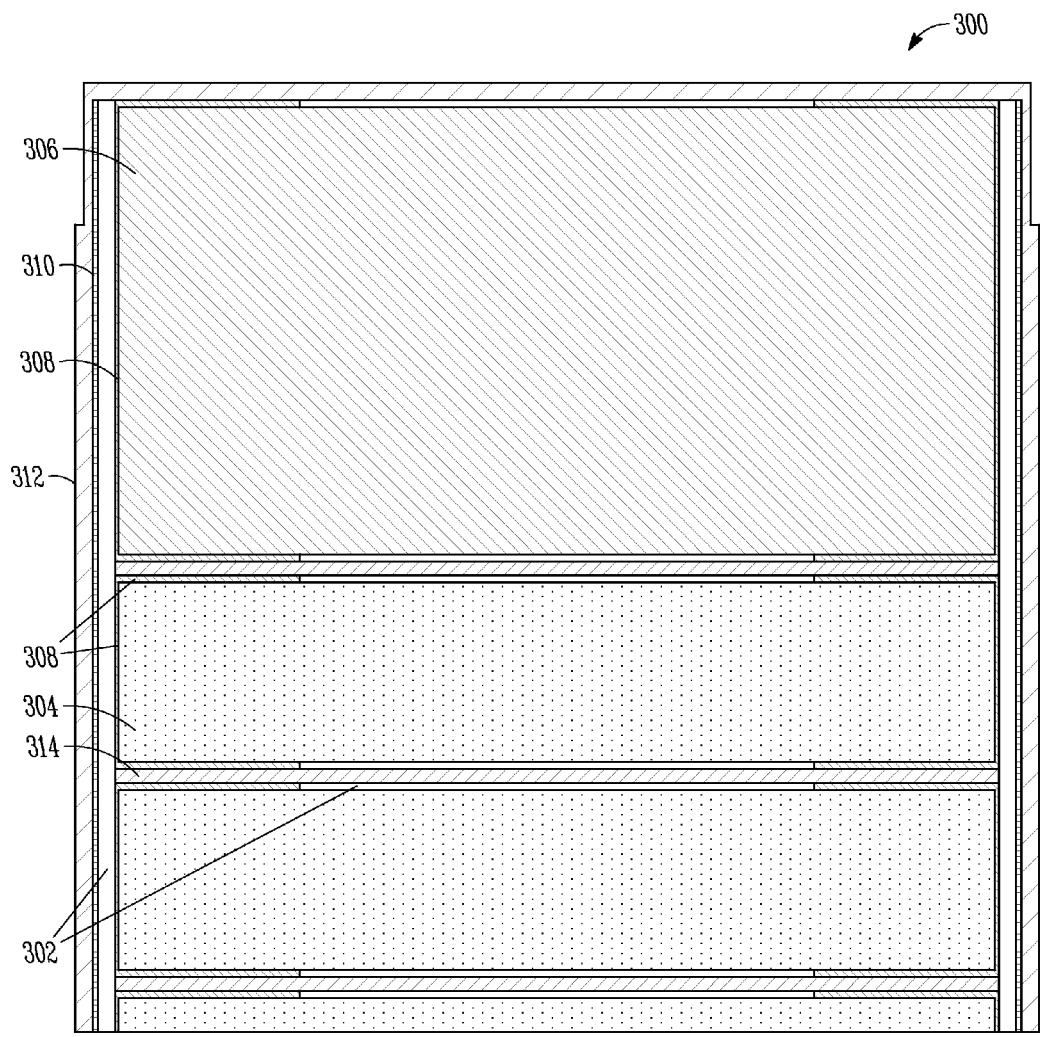
FIG. 3 illustrates a cross-sectional view of an alternative fuel source configuration, according to some embodiments.

In FIG. 3, an alternative cross-sectional view 300 of a fuel source is shown, according to some embodiments. Two or more compressed porous chemical hydride pellets 304 may be contacted with, or at least partially surrounded or wrapped with a flexible, porous, liquid water impermeable, hydrogen and water-vapor permeable layer 308 (such as TEFLON, GORE TEX, or NAFION) that prevents fuel particles from expanding into the gas permeable porous layer 314 or into the region containing porous metal hydride 306. The gas permeable porous layer 314 can serve as a spacer between chemical hydride fuel pellets and between the chemical hydride fuel pellet and the metal fuel pellet. Porous metal hydride 306 is positioned adjacent one end of the stack of chemical hydride pellets. Air gaps 302 are between individual pellets 304, perforated enclosure 312, and porous metal hydride 306. A liquid water impermeable, hydrogen and water-vapor permeable membrane or a particulate membrane 310 (such as TEFLON, GORE TEX, or NAFION) may also be positioned between the pellets 304 and enclosure 312. The chemical hydride pellets may be removable from the perforated enclosure and porous metal hydride. The chemical hydride pellets and a portion of the perforated enclosure may be removable from a portion of the enclosure containing the porous metal hydride.

The fuel source may be utilized in an electrochemical fuel system, such as a system including one or more fuel cells configured to utilize the fuel generated from the fuel source. The fuel source may provide a source of hydrogen fuel for electrochemical cells to operate, such as in portable electronic devices.

The chemical hydride pellet stack may be a part of a removable and disposable or recyclable cartridge for an electrochemical cell such as a fuel cell. In such a cartridge, the metal hydride fuel would be retained in the electrochemical cell, while the stack of chemical hydride pellets and spacers would be removable. Alternatively, the chemical hydride pellets and a portion of the enclosure may be removable from the remainder of the enclosure containing the porous metal hydride. Thus, a fresh chemical hydride pellet stack could replace an exhausted chemical hydride pellet stack allowing the portion of the electrochemical cell containing the porous metal hydride to be reused. For example, the chemical hydride pellet stack can be the size of a standard AA, AAA, C, or D cell (or any other battery size) that can be removed and replaced. The exhausted chemical hydride pellet stack could also be recycled by addition of new chemical hydride pellets.

We claim:

1. A fuel source for an electrochemical cell, comprising:
   multiple chemical hydride pellets contained in a removable cartridge;
   a perforated enclosure substantially surrounding the removable cartridge of chemical hydride pellets;
   multiple metal hydride pellets; and
   a flexible, porous, liquid water impermeable, hydrogen and water vapor permeable membrane, at least partially surrounding the chemical hydride pellets.

2. The fuel source of claim 1, further comprising:
   air gaps between individual chemical hydride pellets and between the chemical hydride pellets and the perforated enclosure; and
   a liquid water impermeable, hydrogen and water vapor permeable membrane or particulate filter positioned between the chemical hydride pellets and the enclosure.

3. The fuel source of claim 1, wherein the chemical hydride comprises $LiAlH_4$, $NaAlH_4$, $KAlH_4$, $MgAlH_4$, $CaH_2$, $LiBH_4$, $NaBH_4$, LiH, $MgH_2$, alkali metals, alkaline earth metals, alkali metal salicides, or any combinations thereof.

4. The fuel source of claim 1, wherein the chemical hydride comprises $LiAlH_4$, $NaAlH_4$, $NaBH_4$, $LiBH_4$, LiH, or any combination thereof.

5. The fuel source of claim 1 wherein the chemical hydride pellets comprise chemical hydride particles having a particle size of from 1-10 μm in diameter.

6. The fuel source of claim 1 wherein the chemical hydride pellets comprise a mixture of chemical hydride particles of different size.

7. The fuel source of claim 6 wherein the particles of chemical hydride have a bimodal distribution such that smaller particles of chemical hydride fit within the interstices of larger chemical hydride particles.

8. The fuel source of claim 1 wherein the metal hydride pellets comprise ab5 compounds, ab2 compounds, ab compounds, complex alloys, intermetallic compounds, solid solution alloys, or any combination thereof.

9. The fuel source of claim 1 wherein the metal hydride pellets comprise $LaNi_5$, $LaNi_4.6Mn_{0.4}$, $MnNi_{3.5}Co_{0.7}Al_{0.8}$, $MnNi_4.2Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, or any combination thereof.

10. A fuel source for an electrochemical cell, comprising:
    chemical hydride particles, positioned in two or more stacks;
    a flexible, porous, liquid water impermeable, hydrogen and water vapor permeable membrane, in contact with and at least partially surrounding each chemical hydride stack; and
    a porous metal hydride layer, separating each chemical hydride stack;
    wherein the fuel source is contained in a removable cartridge.

11. The fuel source of claim 10, further comprising:
    a perforated enclosure, substantially surrounding the removable cartridge of chemical hydride stacks.

12. The fuel source of claim 11 further comprising:
    air gaps between individual chemical hydride pellets and between the chemical hydride pellets and perforated enclosure;
    a flexible, porous, liquid water impermeable, hydrogen and water vapor permeable membrane or particulate filter positioned between the chemical hydride stacks and the perforated enclosure.

13. The fuel source of claim 10 wherein the chemical hydride comprises $LiAlH_4$, $NaAlH_4$, $KAlH_4$, $MgAlH_4$, $CaH_2$, $LiBH_4$, $NaBH_4$, LiH, $MgH_2$, alkali metals, alkaline earth metals, alkali metal silicides, or any combination thereof.

14. The fuel source of claim 10, wherein the chemical hydride comprises $LiAlH_4$, $NaAlH_4$, $NaBH_4$, $LiBH_4$, LiH, or any combination thereof.

15. The fuel source of claim 10, wherein the metal hydrides comprise ab5 compounds, ab2 compounds, ab compounds, complex alloys, intermetallic compounds, solid solution alloys, or any combination thereof.

16. The fuel source of claim 10 wherein the metal hydrides comprise $LaNi_5$, $LaNi_4.6Mn_{0.4}$, $MnNi_{3.5}Co_{0.7}Al_{0.8}$, $MnNi_4.2Co_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$, or any combination thereof.

* * * * *